United States Patent
Wessling et al.

(10) Patent No.: US 7,118,690 B2
(45) Date of Patent: Oct. 10, 2006

(54) DISPERSIBLE POLYMER POWDERS

(75) Inventors: Bernhard Wessling, Bargteheide (DE); Stephan Kirchmeyer, Leverkusen (DE); Dietrich Gehrmann, Leverkusen (DE)

(73) Assignee: H. C. Starck GmbH, Goslar (DE)

( * ) Notice: Subject to any disclaimer, the term of this patent is extended or adjusted under 35 U.S.C. 154(b) by 351 days.

(21) Appl. No.: 10/432,481

(22) PCT Filed: Nov. 20, 2001

(86) PCT No.: PCT/EP01/13390

§ 371 (c)(1),
(2), (4) Date: Oct. 9, 2003

(87) PCT Pub. No.: WO02/42352

PCT Pub. Date: May 30, 2002

(65) Prior Publication Data

US 2004/0051084 A1    Mar. 18, 2004

(30) Foreign Application Priority Data

Nov. 22, 2000 (DE) .................. 100 58 118
Nov. 9, 2001 (DE) .................. 101 55 238

(51) Int. Cl.
*H01B 1/00* (2006.01)

(52) U.S. Cl. ....................... 252/500; 528/377

(58) Field of Classification Search ........... 252/500; 528/377

See application file for complete search history.

(56) References Cited

U.S. PATENT DOCUMENTS

| | | | |
|---|---|---|---|
| 4,910,645 A | 3/1990 | Jonas et al. | 361/525 |
| 5,348,869 A | 9/1994 | Stocker et al. | 435/125 |
| 5,403,467 A | 4/1995 | Jonas et al. | 205/125 |
| 5,462,865 A | 10/1995 | Stocker et al. | 435/125 |
| 5,567,355 A * | 10/1996 | Wessling et al. | 252/500 |
| 6,586,041 B1 | 7/2003 | Ibar | 427/58 |
| 6,632,472 B1 * | 10/2003 | Louwet et al. | 427/126.1 |
| 2003/0211231 A1 | 11/2003 | Ibar | 427/58 |

OTHER PUBLICATIONS

Lefebvre et al "Chemical synthesis, characterization, and electrochemical studies of poly(3,4-ethylenedioxythiophene)/poly(styrene-4-sulfonate) composites" Chem. Mater. 1999, 11, 262-268.*
Chemical Synthesis, Characterization, and Electrochemical Studies of Poly(3,4-thylenedioxy-thiophene)/Poly(styrene-4-sulfonate) Composites, *Chem. Mater.*, 1999, 11, pp. 262-268.

* cited by examiner

*Primary Examiner*—Mark Kopec
(74) *Attorney, Agent, or Firm*—Joseph C. Gil

(57) ABSTRACT

Disclosed herein is a water-dispersible powder consisting essentially of polymers T comprising recurring thiophene units and at least one further polyanionic polymer P and process for preparing and using the same.

9 Claims, No Drawings

DISPERSIBLE POLYMER POWDERS

The invention relates to dispersible polymer powders, their preparation and their use.

Organic, conductive polymers have become increasingly widespread in industry. Application areas are, for example, through contacts in printed circuit boards (EP-A-553 671), antistatic treatment of photographic films (EP-A-440 657) or as electrodes in solid electrode capacitors (EP-A-340 512). Poly-3,4-alkylenedioxythiophenes, which have high stability and electrical conductivity, have gained particular importance.

EP-A-440 657 describes water-soluble or water-dispersible polyalkylenedioxy-thiophenes. These are synthesized directly in an aqueous phase in the presence of polyanions, preferably polystyrenesulfonic acid. The aqueous preparations are used for producing conductive or antistatic coatings.

EP-A-329 768 discloses polymer powders comprising an organic polymer, for example polythiophene. According to Example 2, they can be prepared using nitropropane or nitromethane as solvent/dispersion medium.

An attempt to polymerize poly(3,4-ethylenedioxythiophene) in solvents in the presence of dodecylbenzenesulfonic acid, to filter the poly(3,4-ethylenedioxy-thiophene) obtained and to dissolve it in solvents with the aid of ultrasound and addition of the dispersant dodecylbenzenesulfonic acid is known from Mol. Cryst. Liq. Cryst. 1999, Vol. 327, pages 237–240. However, the polythiophenes prepared in this way were insoluble or only partially soluble.

The invention relates to a preferably water-dispersible powder consisting essentially of polymers T comprising recurring thiophene units and at least one further polyanionic polymer P. The polyanionic polymer P can be present as a salt or acid. The particle size of the powders is preferably less than 1 µm.

In a preferred embodiment, the powder is characterized in that the polymers T are obtained by polymerization of thiophenes of the formula

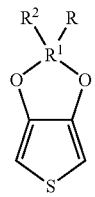

where $R^1$ is a substituted or unsubstituted alkylene radical having from 1 to 10 carbon atoms, in particular —$CH_2$—$CH_2$— and R and $R^2$ are identical or different and are each hydrogen, a linear or branched alkyl radical having from 1 to 20 carbon atoms, OH, O—$CH_2$—$CH_2$—$CH_2$—$SO_3$H or O—alkyl having 1–18 carbon atoms.

Particular preference is given to ethylenedioxythiophene.

In a further preferred embodiment, the powder is characterized in that the polymer P bears at least one sulfonic acid group or salt thereof and is particularly preferably polystyrenesulfonic acid or a salt thereof.

Powders according to the invention can be obtained by removing the water from a colloidal dispersion of the polymers in such a way that the particle structure of the colloidal particles is essentially retained.

In a preferred embodiment, the powders are redispersible powders, i.e. they have been obtained from a dispersion and the powder obtained in this way can be redispersed. Dispersible and redispersible powders in the context of the present invention form stable dispersions which display no changes or no significant changes in the properties on storage at 20° C. for at least 4 weeks, in particular at least 6 months, when dispersed in a dispersion medium.

A preferred process for preparing dispersible powders is characterized in that a dispersion or solution containing polymers comprising recurring thiophene units and at least one further polymer P is admixed with an organic precipitant in which the polymers are insoluble, the precipitant is added in such an amount that the polymers precipitate and these are subsequently isolated and dried.

Organic precipitants which are suitable for this purpose are in principle all organic solvents which are miscible with the dispersion or solution in which the polymers are present and effect precipitation of the polymer. These are preferably organic solvents which are at least partially miscible with water, e.g. alcohols such as methanol, ethanol, propanol, isopropanol and butanol, ketones such as acetone and butanone and ethers such as tetrahydrofuran.

A further preferred process for preparing dispersible powders is characterized in that a dispersion or solution containing polymers comprising recurring thiophene units and at least one further polyanionic polymer P is admixed with a salt, the addition of the salt is continued until the polymers precipitate and the latter are subsequently isolated and dried.

Salts which are suitable for this purpose are in principle all solvents which are miscible with the dispersion or solution in which the polymers are present and effect precipitation of the polymer. Examples of such salts are alkali metal salts such as sodium chloride, sodium bromide, sodium iodide, potassium chloride, potassium bromide, sodium carbonate and sodium hydrogencarbonate, sodium sulfate and sodium hydrogensulfate, potassium carbonate and potassium hydrogencarbonate, potassium sulfate and potassium hydrogensulfate, sodium and potassium formate, acetate, proprionate and butyrate, alkali metal sulfonates such as sodium and potassium methanesulfonate, trifluoromethanesulfonate, the sodium or potassium salt of polystyrenesulfonic acids, the sodium salts or potassium salts of benzenesulfonic acid, toluenesulfonic acids and ethylbenzenesulfonic acids, ammonium salts such as ammonium chloride, ammonium carbonate and ammonium sulfate, soluble alkaline earth metal salts such as magnesium and calcium chloride, bromide and iodide, and soluble transition metal salts.

A further preferred process for preparing dispersible powders is characterized in that a dispersion or solution containing polymers P comprising recurring thiophene units and at least one further polyanionic polymer P is freeze dried. The following embodiments are particularly preferred for this purpose:

One embodiment is characterized in that the dispersion or solution is converted into droplet form, frozen and then freeze dried.

Another embodiment is characterized in that the solution or dispersion is atomized by means of a nozzle.

A further embodiment is characterized in that the solution or dispersion is prilled.

A further embodiment is characterized in that the solution or dispersion is frozen, mechanically comminuted and then freeze dried.

The freeze drying of the dispersions or solutions can be carried out by generally known methods, in particular as described in "Trocknungstechnik", volume two, Springerverlag, Berlin Heidelberg New York London Tokyo 1978, pp. 523–525: freeze drying tunnels, vibrating trays stage dryers, or in "Trocknungstechnik", volume three, Springerverlag, Berlin Heidelberg New York London Tokyo 1989: pp. 189–190: scratch coolers, freezing belt, plate dryers, or in "Handbook of Industrial Drying", second edition revised and extended, Vol. 1. Ed. by Arun S. Mujumdar, Marcel Dekker, Inc. New York, Basel, Hong Kong, 1995, pp. 323–326, tunnel freeze dryers, vacuum spray freeze dryer.

In one embodiment, the bulk freeze drying process is used, with solution being packed in vials and frozen in this form on a cooled plate and subsequently dried under reduced pressure. In this process, the frozen solvent (here water) is transferred by sublimation from the frozen state directly into the vapor phase and the solution is freed of water in this way. Sublimation preferably takes place at product temperatures of from $-5°$ C. to $-50°$ C.

In a further preferred embodiment, the spray freeze drying process is used by producing a snap-frozen microgranulated material by breaking up this solution into droplets in liquid nitrogen or in vaporizing nitrogen and freeze drying this granulated material on a heated plate under reduced pressure. The very rapid freezing of droplets results in formation of a different ice crystal structure than in the case of the bulk process (slow freezing). The crystal structure of the frozen product influences the drying behavior and frequently also the product properties.

In a further preferred embodiment, the solution or dispersion is applied to a cooled roller, for example by the roller dipping into this solution or dispersion. Part of this solution or dispersion freezes on the roller and is removed from the roller during rotation of the roller in the form of flakes. These flakes are introduced by means of a suitable transport device, for example a conveyor belt, in the frozen state into a freeze drying chamber. In this, the adhering solvent or dispersion medium (generally water) is, in a preferred embodiment, removed by sublimation in a first zone; adsorptively bound dispersion medium or solvent can be removed in a subsequent zone by increasing the temperature. The solvent or dispersion medium which has been driven off is advantageously frozen out in a dedicated zone which is located between the freeze drying chamber and the pump which generates the necessary vacuum in the freeze drying chamber.

An air pressure of <0.1 mbar is advantageously set in the first zone in the freeze drying chamber; in a preferred embodiment, the temperature is less than $-10°$ C. In the after-drying section, the same pressure or a lower pressure can be set, while the temperature may be higher and can, in a preferred embodiment, be up to $20°$ C.

A particularly preferred process for preparing dispersible powders is characterized in that a dispersion or solution containing polymers comprising recurring thiophene units and at least one further polyanionic polymer P is admixed with a solvent which forms an azeotrope with water, the water is removed by azeotropic distillation and the polymer obtained is isolated and dried.

Solvents which can be used for the particularly preferred process are solvents which are immiscible or only slightly miscible with water in the liquid phase but form a mixture with water in the vapor phase. Such solvents are known to those skilled in the art. They can be individual solvents or solvent mixtures. Suitable solvents are described, for example, in "CRC Handbook of Chemistry and Physics, 69th Edition, 188, CRC Press, Boca Raton" on pages D-12 to D-13. These are, for example, hydrocarbons such as pentane, hexane, cyclohexane and heptane, halogenated hydrocarbons such as chloroform, tetrachloroethylene and carbon tetrachloride, alcohols such as butyl alcohol, pentanol and benzyl alcohol, esters such as methyl butyrate, ethyl butyrate and propyl propionate, aromatic hydrocarbons such as chlorobenzene, benzene, toluene, ethylbenzene and xylene or ethers such as butyl ethyl ether.

Suitable solvent mixtures are mixtures of the abovementioned solvents and mixtures of the abovementioned solvents with solvents which are miscible with water. Solvent mixtures of the latter type are described, for example, in "CRC Handbook of Chemistry and Physics, 69th Edition, 188, CRC, Press, Boca Raton" on pages D-24 to D-27.

These are, for example, mixtures of carbon tetrachloride and ethanol, carbon tetrachloride and 2-butanol, chloroform and methanol, chloroform and ethanol, tetrachloroethylene and n-propyl alcohol, trichloroethylene and acetonitrile, trichloroethylene and ethanol, trichloroethylene and isopropanol, benzene and acetonitrile, ethyl acetate and ethanol, benzene and ethanol, cyclohexane and ethanol, toluene and ethanol, n-hexane and ethanol, n-heptane and ethanol, benzene and isopropanol, cyclohexane and isopropanol, toluene and isopropanol, propyl alcohol, ethyl propionate, propyl alcohol and benzene, butyl alcohol and hexane, butyl alcohol and dibutyl ether and also isobutyl alcohol and toluene.

The solvents or solvent mixtures are used to remove the water by azeotropic distillation. During removal of the water by distillation, the solvents or solvent mixtures form a mixture with the water in the vapor phase. The boiling curve of the mixture with the solvent or the solvent mixture, i.e. the vapor pressure of the mixture, has a minimum at the composition of the mixture. The water is distilled off together with the solvent or the solvent mixture or is returned by means of suitable apparatuses. The distillation is continued, if appropriate with addition of further solvent or solvent mixture, until at least 90%, preferably 95%, particularly preferably 99%, of the water has been removed from the aqueous solution or dispersion of the substituted or unsubstituted polythiophenes.

Remaining solvent or solvent mixture can be removed from the powders of the invention subsequent to the azeotropic distillation by methods known per se, e.g. filtration, distillation or drying.

The polymer which has been isolated by means of these processes is preferably washed and dried. This gives polymer particles comprising recurring thiophene units ten and at least one further polyanionic polymer P. These can be present together in the form of a complex.

In a particularly preferred embodiment, the dispersions or solvents for obtaining the powders are prepared as described in the European patent EP-B-0 440 957, page 3, line 15, to page 4, line 16, by oxidative polymerization of thiophenes by means of the oxidants customary for oxidative polymerization and/or oxygen or air in the presence of polystyrenesulfonic acid, preferably in an aqueous medium, at temperatures of from 0 to $100°$ C. As a result of the oxidative polymerization, the polythiophenes acquire positive charges.

To carry out the polymerization, the thiophenes, polystyrenesulfonic acid and oxidant are dissolved in an organic solvent or preferably in water and the solution is stirred at the appropriate polymerization temperature until the polymerization is complete.

When using air or oxygen as oxidant, air or oxygen is passed into the solution containing thiophene, polystyrenesulfonic acid and, if desired, catalytic amounts of metal salts until the polymerization is complete.

Depending on the batch size, the polymerization temperature and the oxidant, the polymerization time can be from a few minutes to a number of hours. In general, the time is from 30 minutes to 10 hours. The stability of the dispersions can be improved by means of dispersants such as dodecylsulfonate added during or after the polymerization.

As oxidants, it is possible to use the oxidants suitable for the oxidative polymerization of pyrrole; these are described, for example, in J. Am. Chem. Soc. 85, 454 (1963). For practical reasons, preference is given to inexpensive and easy-to-handle oxidants, e.g. iron(III) salts such as $FeCl_3$, $Fe(ClO_4)_3$ and the iron(III) salts of organic acids and inorganic acids bearing organic radicals, also $H_2O_2$, $K_2Cr_2O_7$, alkali metal and ammonium persulfates, alkali metal perborates, potassium permanganate and copper salts such as copper tetrafluoroborate. It has also been found that air and oxygen can be advantageously used as oxidants, if appropriate in the presence of catalytic amounts of metal ions such as iron, cobalt, nickel, molybdenum and vanadium ions.

The use of persulfates and iron(III) salts of organic acids and inorganic acids bearing organic radicals has the great advantage that they are not corrosive.

Examples of iron(III) salts of inorganic acids bearing organic radicals are the iron(III) salts of the monosulfate esters of $C_1$–$C_{20}$-alkanols, e.g. the Fe(III) salt of lauryl sulfate.

Examples of iron(III) salts of organic acids are the Fe(III) salts of $C_1$–$C_{20}$-alkylsulfite acids, e.g. methanesulfonic and dodecanesulfonic acids; aliphatic $C_1$–$C_{20}$-carboxylic acids such as 2-ethylhexylcarboxylic acids; aliphatic perfluorocarboxylic acids such as trifluoroacetic acid and perfluorooctanoic acid; aliphatic dicarboxylic acids such as oxalic acid and in particular of aromatic sulfonic acids which may be substituted by $C_1$–$C_{20}$-alkyl groups, e.g. benzenesulfonic acid, p-toluenesulfonic acid and dodecylbenzenesulfonic acid.

It is also possible to use mixtures of these Fe(III) salts or organic acids.

The oxidative polymerization of thiophenes theoretically requires 2.25 equivalents of oxidant per mole of thiophene (cf., for example, J. Polym. Sc. Part A Polymer Chemistry Vol. 26, p. 1287 (1988)).

However, the oxidant is preferably employed in a small excess, e.g. an excess of from 0.1 to 2 equivalents per mole of thiophene.

In the oxidative polymerization, the polystyrenesulfonic acid to be used according to the invention is employed in such an amount that from 0.25 to 10, preferably from 0.8 to 8, acid groups of the polystyrenesulfonic acid are present per 1 mole of thiophene.

To carry out the oxidative polymerization, the thiophenes and the polystyrenesulfonic acid are dissolved in such an amount of solvent that stable polythiophene dispersions whose solids content is preferably from 0.5 to 55% by weight, more preferably from 5 to 30% by weight, are obtained.

The polyanionic polymer P is preferably a polystyrenesulfonic acid or a salt thereof having a molecular weight of preferably from 1,000 to 2,000,000, particularly preferably from 2,000 to 500,000. the polystyrenesulfonic acid is commercially available or can be prepared by known methods (cf. Houben-Weyl, Methoden der organischen Chemie, Vol. E 20 Makromolekulare Stoffe, Part 2, (1987), p. 1141ff).

The powders which can be prepared by the process of the invention are dispersible, i.e. they can be processed in a dispersion medium, in particular water, if appropriate with addition of water-miscible solvents, to give solutions or dispersions.

After dispersion, the powders of the invention can be used as dispersions or solutions for producing electrically conductive or antistatic coatings, e.g. by impregnation, spraying, gravure printing, doctor blade coating or painting. After removal of the dispersion medium, e.g. the water, the electrically conductive or antistatic layer which is formed by the polythiophene on the treated component and is independent of the atmospheric humidity is present straight away.

The dispersions obtained can be obtained after intensive stirring or by means of customary dispersion methods and, even without filtration, contain particles significantly smaller than 1 μm and are clear, i.e. not turbid.

The powders can also be processed to form pastes which can be applied, for example, to surfaces to make them antistatic.

Suitable application areas are, for example, the treatment of plastic films for packaging electronic components and for clean room packaging, antistatic treatment of cathode ray tubes, antistatic treatment of photographic films, as transparent electrodes, e.g. for touch screens and organic or inorganic electroluminescent displays, for the production of capacitors, batteries, printed circuit boards or of electrochromic windowpanes.

Prior to the production of coatings, binders and/or crosslinkers such as polyurethanes or polyurethane dispersions, polyacrylates, polyolefin dispersions, epoxysilanes such as 3-glycidoxypropyltrialkoxysilane, can be added to the polythiophene dispersions of the invention. Furthermore, silane hydrolysates, e.g. hydrolysates based on tetraethoxysilane can be added to the coatings to increase the scratch resistance.

The coatings are produced by known methods such as impregnation, spraying, doctor blade coating, gravure printing, offset printing, curtain casting, application by means of rollers, painting, etc.

EXAMPLE 1

A dispersion containing essentially polymer particles comprising recurring thiophene units and polystyrenesulfonic acid is prepared by oxidative polymerization of ethylenedioxythiophene in the presence of polystyrenesulfonic acid as described in EP-B-0 440 957, page 3, line 15, to page 4, line 16. The dispersion is mixed with toluene in the appropriate ratio for azeotropic distillation to remove water (80:20). For this purpose, 60.6 g of the dispersion are stirred with 240 g of toluene in a flask and the water/toluene azeotrope is distilled off at a temperature of 84.1° C. until a pulverulent residue remains in the flask. The residue was washed from the flask by means of methanol, the methanol was removed on a suction filter and the moist powder obtained was dried for 12 hours at room temperature. The powder obtained had a residual moisture content of about 18%.

EXAMPLE 2

Use of a Powder According to the Invention for Preparing a Dispersion 0.5 g of the powder from Example 1 was stirred intensively with 102 ml of water in a flask. This resulted in a blue, stable dispersion which was free of agglomerates even without filtration. 250 mm thick films of the dispersion from Example 2 and of the starting dispersion were in each case applied to polyethylene terephthalate film by doctor blade coating, dried at 100° C. for 3 hours and the resistance was measured. For this purpose, two conductive silver paste electrodes having a length of 2 cm were in each case applied 2 cm apart and the resistance between the electrodes was determined.

| Dispersion | Resistance |
|---|---|
| Dispersion from Example 2 | 450 kΩ |
| Starting dispersion | 380 kΩ |

EXAMPLE 3

The powder from Example 1 was dried at 80° C. in a furnace to a residual moisture content of 0.5%. 600 ml of zirconia milling media (diameter: 0.5 mm) and 270.0 g of ethanol were subsequently placed in a commercial bead mill and stirred at 1000 revolutions. While stirring, 3.8 g of after-dried powder from Example 1 slurried in 35 g of ethanol were introduced into the mill and washed in using 35 g of ethanol. Milling was carried out for 3 hours at 2000 revolutions per minute. The milling media were separated off by means of a filter cloth and the resulting dispersion was filtered through a 4.5 μm filter to remove abraded material. This gave a stable, fine dispersion in which no coarse particles could be observed under a microscope.

A film was produced as described in Example 3 from the resulting dispersion and the surface resistance was determined. A resistance of 9.0 kOhm was measured.

EXAMPLE 4

A dispersion having recurring thiophene units is prepared as described in Example 2 of EP-B-0 440 957 and freeze dried as described in the examples below.

EXAMPLE 4.1

Using the bulk freeze drying method, the dispersion is introduced into glass flasks and frozen on a cooled steel plate at −50° C. at a cooling rate of 1° C./min. Main drying is carried out at a pressure of 0.05 mbar and a temperature of −20° C.; after-drying is carried out at 0.03 mbar and +10° C.

This gives a voluminous powder which is redispersible in water.

EXAMPLE 4.2

The dispersion is introduced dropwise into liquid nitrogen. The snap-frozen granules are placed on boats and introduced into a freeze dryer. Drying is carried out under the same conditions as in Example 4.1. A redispersible powder is once again obtained.

What is claimed is:

1. A process for preparing water-dispersible powders consisting essentially of polymers T comprising recurring thiophene units and at least one further polyanionic polymer P, the process comprising admixing a dispersion or solution containing polymers T and at least one further polyanionic polymer P with a salt, continuing the addition of the salt until the polymers precipitate and subsequently isolating and drying the latter.

2. A process for preparing a powder as claimed in claim 1, wherein the salt is selected from the group consisting of sodium chloride, sodium bromide, sodium iodide, potassium chloride, potassium bromide, sodium carbonate, sodium hydrogencarbonate, sodium sulfate, sodium hydrogensulfate, potassium carbonate, potassium hydrogencarbonate, potassium sulfate, potassium hydrogensulfate, sodium and potassium formate, acetate, proprionate and butyrate, alkali metal sulfonates, sodium or potassium salts of polystyrenesulfonic acids, sodium or potassium salts of benzenesulfonic acid, toluenesulfonic acids and ethylbenzenesulfonic acids, ammonium salts, soluble alkaline earth metal salts, and soluble transition metal salts.

3. A process for preparing a powder as claimed in claim 1, wherein the particle size of the polymers is less than 1 μm.

4. A process for preparing a powder as claimed in claim 1, wherein the polymers comprising recurring thiophene units are obtained by polymerization of thiophenes of the formula

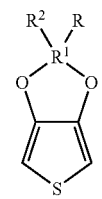

where
$R_1$ is a substituted or unsubstituted alkylene radical having from 1 to 10 carbon atoms and
R and $R_2$ are identical or different and are each hydrogen, a linear or branched alkyl radical having from 1 to 20 carbon atoms, OH, O—OH$_2$—CH$_2$—CH$_2$—SO$_3$H or O-alkyl having 1–18 carbon atoms.

5. A process for preparing powder as claimed in claim 1, wherein the polymer P is polystyrenesulfonic acid.

6. A process for preparing water-dispersible powders consisting essentially of polymers T comprising recurring thiophene units and at least one further polyanionic polymer P, the process comprising admixing a dispersion or solution containing polymers T and at least one further polyanionic polymer P with a compound which forms an azeotrope with water, removing the water by azeotropic distillation and obtaining the polymer by isolating and drying.

7. A process for preparing powder as claimed in claim 6, wherein the particle size of the polymers is less than 1 μm.

8. A process for preparing powder as claimed in claim 6, wherein the polymers comprising recurring thiophene units are obtained by polymerization of thiophenes of the formula

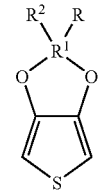

where
$R^1$ is a substituted or unsubstituted alkylene radical having from 1 to 10 carbon atoms and
R and $R_2$ are identical or different and are each hydrogen, a linear or branched alkyl radical having from 1 to 20 carbon atoms, OH, O—OH2—CH$_2$—CH$_2$—SO$_3$H or O-alkyl having 1–18 carbon atoms.

9. A process for preparing powder as claimed in claim 6, wherein the polymer P is polystyrenesulfonic *acid*.

* * * * *

UNITED STATES PATENT AND TRADEMARK OFFICE
CERTIFICATE OF CORRECTION

| | |
|---|---|
| PATENT NO. | : 7,118,690 B2 |
| APPLICATION NO. | : 10/432481 |
| DATED | : October 10, 2006 |
| INVENTOR(S) | : Bernhard Wessling et al. |

It is certified that error appears in the above-identified patent and that said Letters Patent is hereby corrected as shown below:

In the Claims:

In Claim 4, at column 8, line 26, "$R_1$ is a substituted or unsubstituted alkylene radical hav-" should read -- $R^1$ is a substituted or unsubstituted alkylene radical hav- --.

In Claim 4, at column 8, line 28, "R and $R_2$ are identical or different an each are hydrogen," should read -- R and $R^2$ are identical or different an each are hydrogen, --.

In Claim 4, at column 8, line 30, "carbon atoms, OH, O-$OH_2$-$CH_2$-$CH_2$-$SO_3H$ or" should read -- carbon atoms, OH, O-$CH_2$-$CH_2$-$CH_2$-$SO_3H$ or --.

In Claim 8, column 8, line 60, "R and $R_2$ are identical or different an each are hydrogen," should read -- R and $R^2$ are identical or different an each are hydrogen, --.

In Claim 8, column 8, line 62, "carbon atoms, OH, O-$OH_2$-$CH_2$-$CH_2$-$SO_3H$ or" should read -- carbon atoms, OH, O-$CH_2$-$CH_2$-$CH_2$-$SO_3H$ or --.

Signed and Sealed this

Third Day of April, 2007

JON W. DUDAS
*Director of the United States Patent and Trademark Office*